June 3, 1969   S. C. MARTIN   3,447,380
PRESSURE INDICATING APPARATUS
Filed June 30, 1967
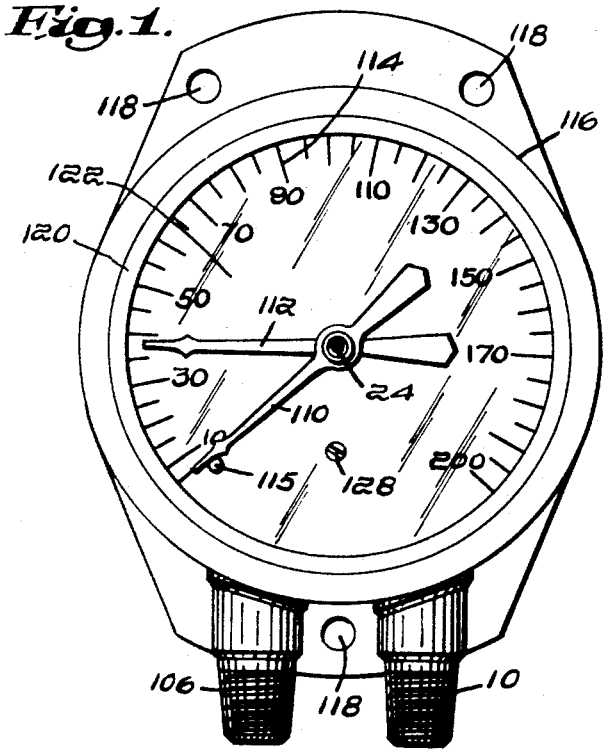
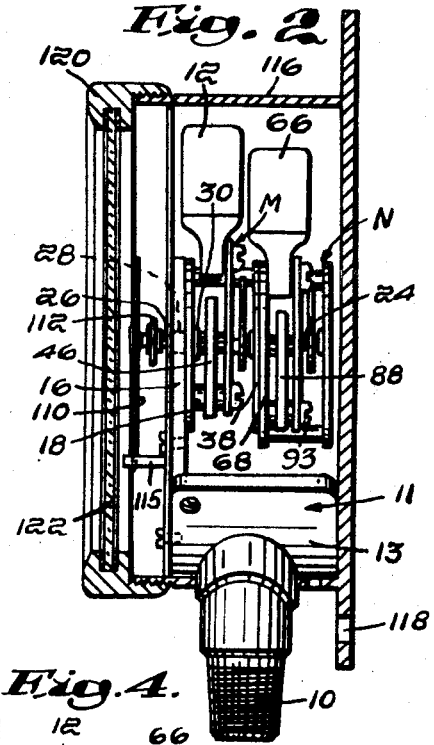
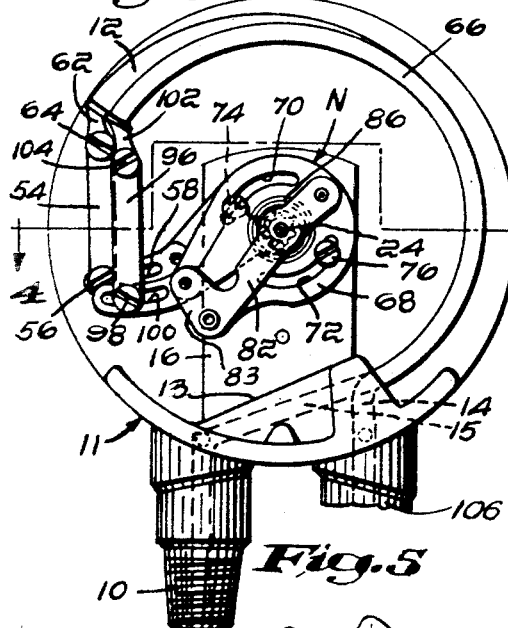
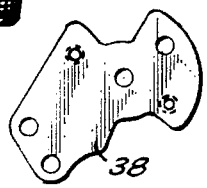
Inventor:
Sidney C. Martin
Harold E. Cole
by
Attorney _United States Patent Office_

3,447,380
Patented June 3, 1969

3,447,380
PRESSURE INDICATING APPARATUS
Sidney C. Martin, 12 Bridge St.,
Concord, N.H. 03301
Filed June 30, 1967, Ser. No. 650,459
Int. Cl. G01l 7/04
U.S. Cl. 73—412                                                2 Claims

ABSTRACT OF THE DISCLOSURE

Pressure indicating apparatus having at least two movements separately communicating with two pressure gauge tubes, which movements may be calibrated separately whereby two readings, such as pressure and vacuum gauge readings respectively, can be obtained with a unitary device.

---

One object of my invention is to provide at least two independent movements in pressure indicating apparatus which have a common supporting means with a single pressure socket having two passages communicating with said movements whereby a unitary device will give two independent readings.

Another object is to provide adjustment of each movement independently by rotating either of two attaching members, or both, and to which actuating levers are connected, to any desirable, predetermined position.

A further object is to effect the above objects while keeping the cost of manufacture and repair to a minimum since important parts serve both movements.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and, therefore, I am not to be limited to the particular construction disclosed by the drawing nor to that described in the specification, but am entitled to all such changes therefrom as fall within the scope of my claims.

In the drawing:

FIG. 1 is a front elevational view of my pressure indicating apparatus shown with conduits that connect with Bourdon pressure tubes.

FIG. 2 is a side elevational view of said apparatus with a casing therefore shown in section.

FIG. 3 is a rear elevational view of said apparatus with the casing removed.

FIG. 4 is an enlarged, sectional view taken on the line 4—4 of FIG. 3.

FIG. 5 is a plan view of an intermediate mounting member.

As illustrated, a conduit 10 communicates with supporting means 11 with which a well-known Bourdon or pressure tube 12 communicates. Said means 11 has an arcuate chamber or socket portion 13 having a passage 15 therethrough that communicates with said tube 12 and conduit 10. Said portion 13 has another passage 14 that communicates with a tube 66 and conduit 106 later referred to. Extending angularly and upwardly from said arcuate portion 13, as shown, said supporting means 11 has an upwardly extending, angular, extension support 16 furnishing support for two movements M and N that respond to pressure.

Said supporting means 11 has an attaching member 18 that is screwed as at 22 to the extension support 16.

A relatively long shaft 24 rotatably extends at one end through said attaching member 18 and through a dial face 114 later described. This shaft 24 passes through both movements M and N and is rotatably supported at an opposite end by an exterior support 82 later referred to. Rotating of movement N is effected by this shaft 24.

A hollow shaft 26 is rotatably mounted over said shaft 24 and rotates independently of the latter in a fixed bushing 28 that frictionally extends through a hole in said attaching member 18. This bushing 28 is retained in position by a collar member 30 bearing against said attaching member 18. A pinion 32 is fixedly mounted on shaft 26 and rotates therewith.

A stabilizing spring 34 is connected to and coiled around said shaft 26 and one end is attached to a spacer 36. The latter extends between said attaching member 18 and an intermediate mounting member 38 forming part of said supporting means 11 and which fixedly receives a bushing 40 that rotatably receives said shaft 26. A spacer 42 extends from attaching member 18 to mounting member 38 being attached to both. A lever shown as a segmental gear 46 serves as an actuating member and has teeth 48 that mesh with said pinion 32. A shaft 50 rotatably supports said segmental gear 46 and rotatably connects with said member 18 and mounting 38. A collar 52 is fixed on said shaft 50 and serves to position said gear 46 properly.

A link 54 movably connects at one end with said gear 46 by a screw 56 that passes through a slot 58 in said gear 46 and screwthreadedly connects with a nut 60 outside the latter. Said link 54 connects at the opposite end to an angular closed tip portion 62 at the end of said Bourdon tube 12 by a screw 64.

Another Bourdon tube 66 is opposite and extends parallel with said tube 12 communicating with said passage 15. It operates independently of said tube 12. Said conduit 106 communicates with tube 66.

Said movement N has an intermediate attaching member 68 forming part of said supporting means 11 and it has two arcuate slots 70 and 72 therethrough. Screws 74 and 76 extend through slots 70 and 72 respectively and screw into said mounting 38 fixedly joining the latter to said attaching member 68. A spacer 78 extends between and is joined to said attaching member 68 and said exterior support 82 as does another spacer 80.

An exterior support 82 having a relatively short, angular portion 83 is at the exterior of said movements M and N, and provides support as heretofore explained, constituting part of the supporting means 11.

A pinion 84 is fixedly mounted on said shaft 24 and rotates therewith. A stabilizing spring 86 is connected to and coiled around said shaft 26 and one end is attached to said spacer 78.

An actuating lever shown as a segmental gear 88 has teeth 90 that mesh with said pinion 84. A shaft 92 rotatably supports said gear 88 and extends between said exterior support 82 and attaching member 68. A collar 94 is fixed on said shaft 92 serving to position said gear 88 properly.

A link 96 movably connects with said gear 88 by a screw 98 that extends through a slot 100 in gear 88 and screw-threadedly connects with a nut 101. Said link 96 also connects by a screw 104 to an angular closed tip portion 102 at the end of Bourdon tube 66.

Pressure indicating means includes an indicator hand 110 fixed on shaft 24 and another indicator hand 112 so fixed on shaft 26. A dial 114 with well-known numerals thereon enables said indicator hands 110 and 112 each to provide a reading as they are moved independently of each other by rotation of said shafts 24 and 26. A stop pin 115 set in said dial limits the return movements of hands 110 and 112.

A casing 116 encases my device and has holes 118 therethrough to receive mounting screws not shown. A bezel 120, in which a glass 122 is set, protects said dial. A spacer 124 mounted on shaft 26 spaces said hands 110 and 112 apart and another spacer 126 thereon spaces said hand 110 from said dial 114. A screw 128 attaches said dial to said extension support 16.

I claim:
1. Pressure indicating apparatus comprising supporting means, two pressure indicating movements supported by said means and adapted to be independently actuated respectively by movements of two pressure gauge tubes, a first of said movements embodying a first shaft rotatably supported by said means, a second of said movements embodying a second and hollow shaft rotatably supported by said means, said first shaft extending through said second shaft, said shafts being rotatable independently of each other, indicating members attached respectively to said shafts and movable therewith, and means intermediate the front and rear extremities of said apparatus supporting said shafts and embodying a mounting member and a first attaching member, and means atching said latter two members together, said supporting means embodying another attaching member, an exterior support, said first shaft extending through said attaching members, mounting member and to said exterior support, and means spacing said another attaching member from said mounting member and other means spacing said first attaching member from said exterior support.

2. Pressure indicating apparatus as set forth in claim 1, each of said movements embodying an actuating lever, a shaft rotatably mounted in said other attaching member and said mounting member and rotably supporting one of said actuating levers, and another shaft rotatably mounted in said first attaching member and said exterior support and rotatably supporting the other of said actuating levers.

References Cited

UNITED STATES PATENTS

| 1,848,489 | 3/1932 | Motherwell | 73—411 |
| 2,101,028 | 12/1937 | Klein et al. | 73—412 |
| 2,141,211 | 12/1938 | Hopkins | 73—415 |
| 2,989,863 | 6/1961 | Camilli | 73—49.3 |

FOREIGN PATENTS

| 696,393 | 10/1964 | Canada. |

LOUIS R. PRINCE, *Primary Examiner.*

D. E. CORR, *Assistant Examiner.*